United States Patent [19]

Hepp et al.

[11] 3,902,770

[45] Sept. 2, 1975

[54] HYDRODYNAMICALLY-ACTING FRICTION BEARING AND METHOD OF MANUFACTURE

[75] Inventors: Wolfgang Hepp, Immenstaad; Klaus Pimiskern, Friedrichshafen; Werner Herbert, Markdorf, all of Germany

[73] Assignee: Dornier System GmbH, Germany

[22] Filed: Apr. 3, 1974

[21] Appl. No.: 457,397

[30] Foreign Application Priority Data
Apr. 18, 1973  Germany.............................. 2319623

[52] U.S. Cl. ................ 308/9; 308/159; 308/DIG. 8
[51] Int. Cl.² ..................... F16C 17/16; F16C 17/04
[58] Field of Search .......... 308/9, 159, 230, DIG. 1, 308/DIG. 8; 29/148.4 R, 149.5

[56] References Cited
UNITED STATES PATENTS

| | | | |
|---|---|---|---|
| 3,207,563 | 9/1965 | Muhderman.................... | 308/159 X |
| 3,265,452 | 5/1965 | Paw et al. ....................... | 308/DIG. 1 |
| 3,799,629 | 3/1974 | Laing....................................... | 308/9 |
| 3,836,214 | 9/1974 | Gengard .............................. | 308/159 |
| 3,856,367 | 12/1974 | Wohnhaas et al. ..................... | 308/9 |

*Primary Examiner*—M. Henson Wood, Jr.
*Assistant Examiner*—Gene A. Church
*Attorney, Agent, or Firm*—James E. Bryan

[57] ABSTRACT

A hydrodynamically-acting friction bearing including a shaft having a central conical bore formed in its end and a roller bearing ball, having spiral, shallow grooves extending below the equator thereof to urge lubricant from the outside of the bearing toward the center, affixed in the conical bore, the dimension of the conical bore with respect to the ball being such that a gap is formed between the edge of the shaft and the line of contact of the conical bore and ball, a bond formed in the gap to affix the ball to the shaft, as by soldering, adhesively bonding or electron beam welding, and a supporting member of a hardenable alloy operatively cooperating with the shaft and ball and having an imprint of a hemispherical ball cup or socket formed, in an initially plane surface, by punching another roller bearing ball into the plane surface, applying a coating of a hardenable nickel alloy to the surface of the imprint, again punching a roller bearing ball into the coated imprint and hardening the supporting member and coating, at least in the area of the imprint, the ball on the shaft and the imprint in the supporting member being dimensioned with respect to one another such that a small gap exists between the ball on the shaft and the imprint in the supporting member. In the punching of the supporting member, the supporting member is placed in a countersink of a die, the die is further countersunk to receive an annular elastic ring which fits about the periphery of the supporting member adjacent the surface to be punched, to accommodate material displaced during punching, and a bore is also formed in the die on the side opposite the surface to be punched to accommodate material displaced by the punching.

16 Claims, 4 Drawing Figures

HYDRODYNAMICALLY-ACTING FRICTION BEARING AND METHOD OF MANUFACTURE

The present invention relates to a hemispherical, spiral-grooved bearing for high-speed components of devices, in which predominantly axial forces, but to a certain extent radial forces, are absorbed by the bearing.

For high-speed devices, such as ultra-gas centrifuges, medical instruments, gyroscopic devices for navigation and aircraft position control, etc., which, in part, have very small bearing dimensions in their structural configuration, bearings are required which, in operation, are characterized by a great quietness or smooth running and a long service life with as little friction as possible.

Known constructions, of so-called hydrodynamically-acting, friction or sliding bearings, operate according to the principle of a rotary shaft and a stationary supporting member, between which a lubricating film is built up. The rotary shaft is provided with a hemispherically-shaped end and, the hemispherical surface is provided with spiral-shaped, shallow grooves, which, depending upon the direction of rotation, extend from below the equator thereof toward the pole of the sphere, thus urging the lubricant from the outside of the bearing toward the center. The counterpiece of this sphere is a ball cup or socket which must be fitted exactly with respect to the hemisphere rotating therein. The accuracy of the sphere and of the ball cup or socket, with regard to each other, are codeterminative so that a film of lubricant can be established at sufficiently high pressure through the spiral-shaped grooves. The tolerance between the ball and ball cup enters directly into the bearing strength or load capacity of the bearing as an essential factor. The manufacture of accurate ball cups or sockets and shafts with a ball or sphere integrally carried on one end involves great expenditures and considerable difficulties in the construction of bearings having small bearing diameters. Thus, the manufacture of an accurate sphere half at the end of a shaft is possible only as a result of substantial mechanical processing expenditures. The corresponding sphere half is ground-in together with the coordinated ball cup. Both parts must be characterized as belonging together, or being corresponding or mating elements, hence an exchange of the individual components is no longer possible after this processing phase. A further disadvantage resides in the mounting or assembly and maintenance of such bearings, inasmuch as only complete bearings can be exchanged; in other words, ball cups together with the coordinated sphere or ball and shaft. Also, during assembly, the correlation or mating of the jointly processed bearing components must be strictly observed and adhered to.

The primary objectives of the present invention are to provide a spiral-grooved bearing having a high degree of accuracy and efficiency and simple manufacture, assembly and maintenance, which is also suitable, particularly in the case of small ball diameters, for mass or series production.

Copending application Ser. No. 333,312, filed Feb. 16, 1973 by Horst Wohnhaas, et al, and assigned to a common assignee, accomplishes these objectives in a simple and effective manner.

The previously-mentioned Application relates to a hydrodynamically-acting friction bearing having a spherical shaft end and a supporting member having a hemispherical imprint or depression operatively associated with the shaft end. Such bearings find use in apparatus or instruments rotating at high speed, in which primarily axial forces and to some degree radial forces must be absorbed by the bearing. In such bearings, for example in gyroscopic devices for navigation or for medical apparatus, very small bearing dimensions are frequently called for, because of the structural make-up of these devices, while at the same time a high degree of smoothness and quietness of operation and long service life together with as small a degree of friction as possible during operation and a high degree of accuracy during the manufacture are required, since the tolerance between the sphere and the spherical indentation are an essential factor of the bearing requirements.

The aforementioned Application therefore proposes a construction which satisfies all of these requirements while, at the same time, allowing for a particularly simple mass production of the bearing. In this application, the supporting member is formed from a body having a plane surface and consisting of a hardenable alloy. Impressed into the surface of the supporting member, by means of a roller bearing sphere, is the imprint of a hemispherical indentation and a second roller bearing sphere of the same order of magnitude, but with smaller dimensions to form a bearing gap, is disposed at the shaft end. In actual practice, the spherical shaft ends of such bearings are frequently equipped with spirally-extending grooves originating from the equator of the spherical gliding surface and extending in the direction of the pole of the sphere. These grooves convey lubricant toward the center of the bearing and thus achieve a pressure build-up and therewith a supporting lubricant film for the hydrodynamically-acting friction bearing. During the startup of operation of such spiral groove bearings, direct contact is produced between the bearing gliding surfaces, until, at higher speeds, the supporting lubricant film is established by the spiral grooves. Because of this essentially non-lubricated, direct contact of the bearing gliding surfaces during startup, solid particles may be produced because of the abrasive contact which, after a period of operation of the bearings, become an emery-like substance and damages the bearing gliding surfaces. The solid particles strike, during the deflection of the oil stream, upon the bearing gliding surface, particularly at the pole-side groove, and after a long period of operation result in an erosion process. These conditions have a considerable influence upon the service life of spiral groove bearings, particularly in repetitive operation of the bearings due to the starting operation being frequently repeated. It has therefore been proposed in the art to provide special annular grooves near the center of rotation of the sphere in which the abrasive particles can be collected.

However, during actual operation it was found that, particularly in the starting phase when the bearing does not yet operate fully hydrodynamically, abrasion will occur, particularly when the assembly of the bearing is not entirely flawless.

It is therefore the primary object of the present invention to further improve the construction and method of manufacture of the aforementioned application to keep the wear and tear to a minimum, and to achieve the highest possible bearing precision.

This objective is obtained, in accordance with the present invention, by applying a hardenable nickel alloy to the surface of the hemispherical indentation, after the original imprinting operation, and, thereafter, additionally calibrating or forming the indentation with the imprinting or embossing tool. The coating of the hemispherical indentation surface, as such, is performed according to known methods. The coating thickness may be, for example, about 5 to 20 μm. The required high degree of accuracy of the bearing is obtained by the additional calibration or imprinting of the indentation with the spherical imprinting tool. At that time, any surface roughness still present in the original coating is reduced and the required high degree of accuracy of the bearing is achieved. It is advantageous that, when a copper-beryllium alloy is used for the supporting member, the hardening temperatures for the supporting member and for the coating be approximately the same. The achievable hardness of the coating is very high and, as a result, the wear and tear of the surface is kept extremely low. The operating characteristics of the bearing, during the start-up of operation and at low speeds, when the hydrodynamic lubrication has not yet fully begun, are therefore significantly improved.

One embodiment of the spiral-grooved bearing of the present invention, as well as of the imprinting device will now be described in further detail with reference to the accompanying drawings wherein.

Figure 1:
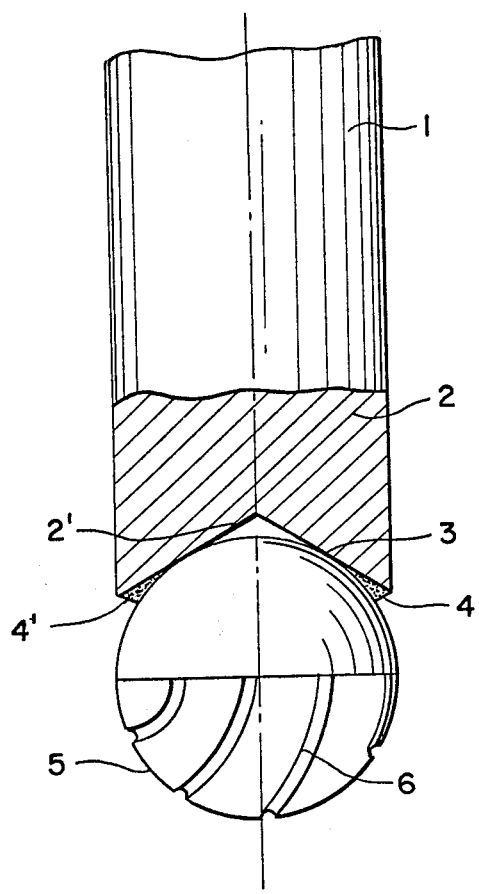
FIG. 1 illustrates the shaft end with the roller bearing ball connected thereto.

Shown in FIG. 1 is the shaft 1 with the shaft end 2 and a conical centering bore 2' in the shaft end 2. The conical centering bore 2', in the shaft end 2, centrally receives a roller bearing ball 5, and the shaft edge 4 projects beyond the line of contact 3, which will be produced between the spherical surface and the bore well, thus providing an annular, wedge-shaped gap 4'. This gap 4' may serve to receive an adhesive or solder which rigidly connects the roller bearing ball 5 with the shaft 1. Furthermore, the projecting shaft edge 4 may be welded to the roller bearing ball 5 by fusing with the aid of an electron beam welding device. Because of these types of bonding or connection, the roller bearing ball 5 will not be impaired, in the area of the subsequently applied spiral grooves 6, with respect to the hardness and accuracy of shape thereof nor with respect to its surface quality. The application of the spiral grooves 6 on the ball 5 is not an object of the present invention and will therefore not be further described herein.

Figure 2:
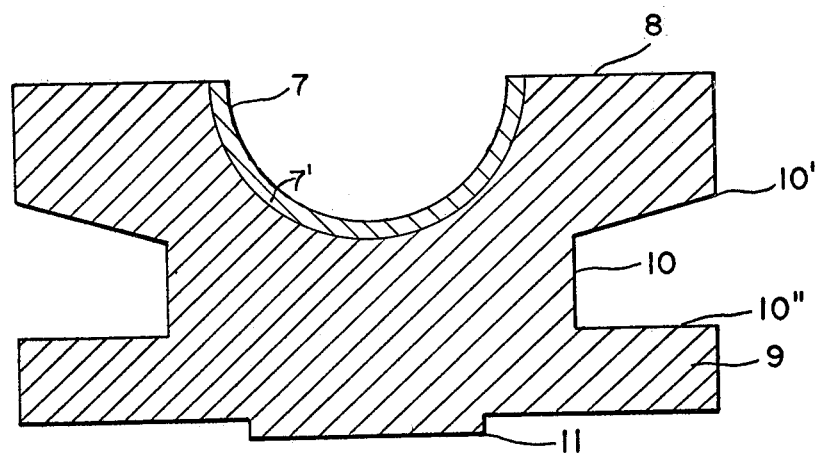
FIG. 2 illustrates the supporting member with the impressed or imprinted segment or cup.

FIG. 2 shows a supporting member 9 with an embossed or impressed segment or cup 7 and a nickel alloy coating 7'. The supporting member 9 advantageously has an axially symmetrical shape and is provided, in the area of the segment 7, with an annular contraction, waisting or annular groove 10, which, on the side facing the segment 7, has an inclined groove wall 10', and on the side opposite the segment 7 a groove wall 10" positioned at a right angle with respect to the axis of rotation. This contraction 10 has the effect that, during the imprinting or embossing operation for the segment by means of a roller bearing ball, the material of the supporting member can flow substantially unimpeded, which will result in a precise imprint of the roller bearing ball employed for the embossing, not only with respect to accuracy of shape but also with respect to surface quality. The buckled or projecting portion 11 found at the opposite side of the segment or imprint 7 is also formed by the flow of material produced when the ball of the embossing tool is pressed in. Following imprinting of the supporting member 9, layer or coating 7' of a hardenable nickel alloy is applied to the imprinted surface 7 by conventional methods. Thereafter, the coated imprint is again punched with the imprinting or embossing tool. The supporting body 9, including the coating 7' is hardened, usually by air exposure.

Figure 3:
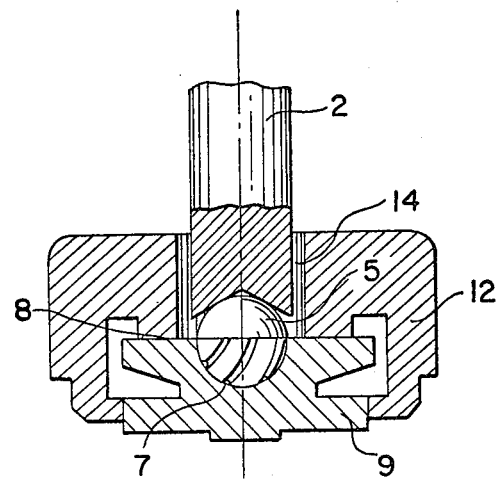
FIG. 3 is a side view of the complete bearing.

FIG. 3 illustrates a side view of the bearing in its entirety. Represented in this figure are the shaft end 2 with the roller bearing ball 5 connected thereonto, the supporting body 9, and the carrying and holding device 12. The carrying and holding device 12 is so provided and arranged that it receives the supporting body 9 and encloses the roller bearing ball 5 with a portion of the shaft end 2. The bore 14, of the carrying and holding device 12 is provided with a galvanic coating, representing an abrasion-proof surface, which allows the shaft 1, together with the roller bearing ball 5 connected thereto, to be driven in and out without causing abrasion of the bore wall 14 of the carrying and holding device. It has been discovered that such abrasion, during the operation of the bearing, leads to increased wear and tear of the active bearing components and profoundly affects the service life of the bearing. The carrying and holding device 12 centrally receives the supporting body 9, in the area of the segment 7 and on the surface 8, and on the outside diameter of the supporting body 9 below the section containing segment 7. Furthermore, the supporting body 9 is screwed, with the carrying and holding device 12 receiving it, into a bearing housing (not shown herein), and thus fixed or secured in the axial direction.

Figure 4:
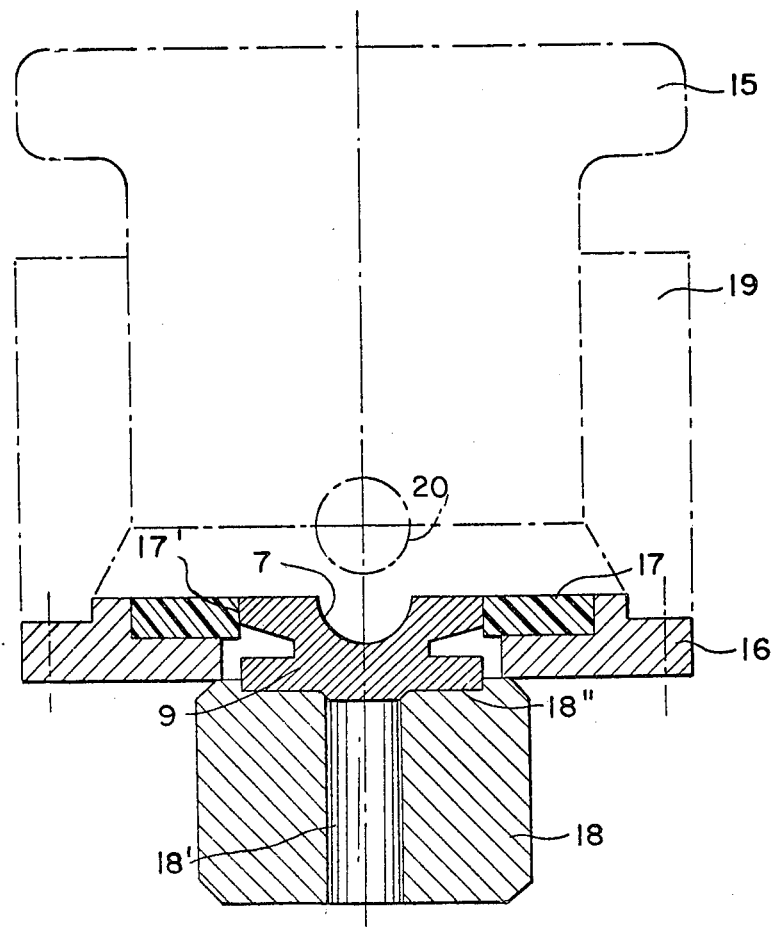
FIG. 4 illustrates a receiving device for the impressing or embossing operation.

FIG. 4 represents a receiving device which receives or houses the supporting body 9 during the impressing or embossing operation. The following structural elements are shown in this figure: a stamp or punch 15, a stamp or punch guide 19, a centering plate 16, a receiving body 18, and a supporting body 9. The centering plate 16 has a central, pressed-in elastic ring 17, which may consist, for example of the plastic "Vulkolan," available on the market, and whose inside diameter 17' receives the supporting body 9, at the outside diameter, within the area of the segment or imprint 7. Moreover, the supporting body 9 is received or housed by the receiving body 18 in a countersink 18" of smaller depth. The countersink 18" of the receiving body is provided with a central bore 18'.

For imprinting the segment 7 in the supporting body 9, a stamp or punch 15 (here shown in dash-dotted lines) is used with a stamp or punch guide 19, and this punch has a central hemispherical recess, which serves to receive a roller bearing ball 20 for the embossing operation, on the imprinting or embossing side. When the roller bearing ball 20 is pressed into the supporting body material, which has not yet fully hardened and which may consist, for example, of a $CuBe_2$ alloy, a material flow is produced which results in an increase of the diameter of the supporting body 9. This increase in diameter is elastically absorbed by the ring 17 of the centering plate 16, so that a lasting deformation of the supporting body 9 will arise as a consequence During the imprinting or embossing operation, the bore 18', in the receiving body 18, likewise allows for an expansion of the material of the supporting body in the axial direction. The arrangement described hereinabove and the contraction or waisting at the outside diameter of the supporting body 9 have the advantage that the cup-shaped imprint or embossing in the supporting body 9 is imparted by a roller bearing ball 20 of a highly precise shape and surface accuracy.

The bearing construction and method of manufacture described herein are advantageous not only for spiral groove bearings but may be employed in the construction of other types of bearings, and specifically in any case where metallic contact of the bearing parts is present at low speed and a hydrodynamic lubrication begins at a later time when high speeds are attained.

It will be obvious to those skilled in the art that many modifications may be made within the scope of the present invention without departing from the spirit thereof, and the invention includes all such modifications.

What is claimed is:

1. In a bearing structure having at least two bearing parts and in which direct metallic contact occurs between said bearing parts at low speed and said bearing parts are hydrodynamically lubricated at higher speeds, the improvement comprising a coating of a nickel alloy on at least one of said parts.

2. A bearing in accordance with claim 1 wherein the bearing is a hydrodynamically-acting friction bearing.

3. A bearing in accordance with claim 1 wherein the bearing includes a shaft having a spherical end and a supporting member with a hemispherical imprint therein adapted to operatively receive said spherical end and the coating is on the surface of said hemispherical imprint.

4. A bearing in accordance with claim 3 wherein the shaft has a roller bearing ball affixed to the end thereof to form the spherical end.

5. A bearing in accordance with claim 3 wherein the supporting member is a hardenable alloy and the hemispherical imprint is formed in an initially plane surface by punching a roller bearing ball into said plane surface, the coating is then applied to the surface of the hemispherical imprint and said coated imprint is again punched with a roller bearing ball before hardening of said hardenable alloy.

6. A bearing in accordance with claim 5 wherein the roller bearing ball affixed to the shaft has dimensions of the same order of magnitude but slightly smaller than the dimensions of the hemispherical imprint to form a gap between said roller bearing ball and said hemispherical imprint.

7. A bearing in accordance with claim 4 wherein the shaft has formed therein a conical centering bore having dimensions such that said bore will receive the roller bearing ball and form a gap between the shaft edge, projecting beyond the line of contact between said bore and said roller bearing ball.

8. A bearing in accordance with claim 7 wherein the gap formed between the projecting shaft edge and the roller bearing ball contains a bonding material for affixing said roller bearing ball to said shaft end.

9. A bearing in accordance with claim 8 wherein the bonding material is solder.

10. A bearing in accordance with claim 8 wherein the bonding material is an adhesive.

11. A bearing in accordance with claim 7 wherein the roller bearing ball is electron beam welded to the shaft end in the gap between the shaft edge and said roller bearing ball.

12. A bearing in accordance with claim 7 wherein the roller bearing ball has spiral grooves formed in the surface thereof.

13. A bearing in accordance with claim 5 wherein the supporting member has an axially symmetrical shape.

14. A bearing in accordance with claim 5 wherein the supporting member has an annular waisting formed about its periphery.

15. A bearing in accordance with claim 14 wherein the upper wall of the annular waisting, nearest the imprint of the spherical segment, extends diagonally toward the central axis of the supporting members and the wall of said annular waisting, furtherest from said imprint of said spherical segment, extends perpendicularly toward said central axis of said supporting member.

16. A bearing in accordance with claim 5 wherein a holding means is affixed to the supporting member and has a central bore therein to receive the shaft end and an abrasion-proof surface formed on the wall of said central bore.

* * * * *